No. 801,354. PATENTED OCT. 10, 1905.
F. S. BECKETT.
POCKET CALCULATOR.
APPLICATION FILED JUNE 15, 1904.
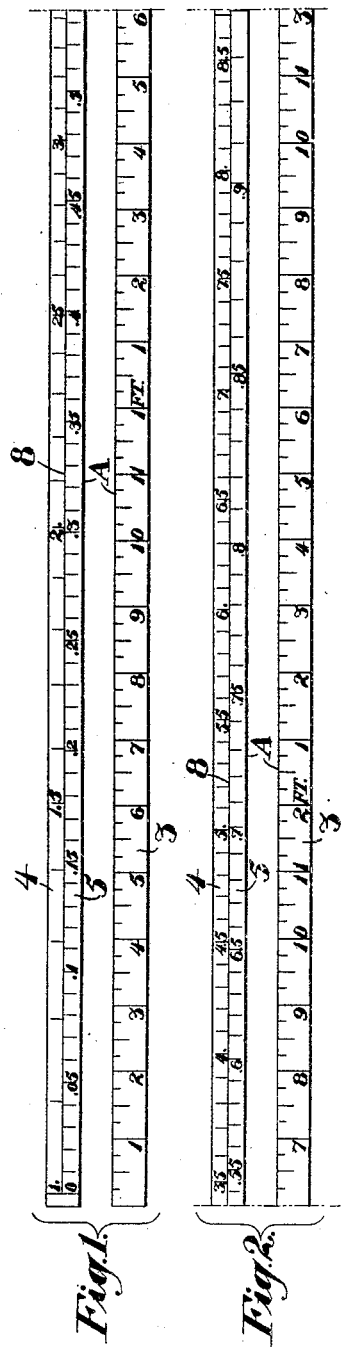
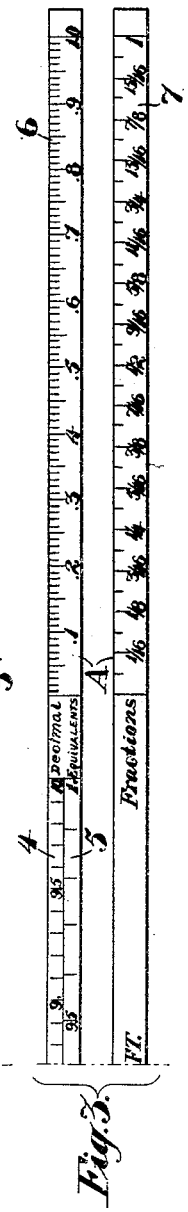
Witnesses:-
F. C. Fliedner
G. H. Howse
Inventor,
Franklin S. Beckett
By Geo. H. Strong Atty

UNITED STATES PATENT OFFICE.

FRANKLIN S. BECKETT, OF SAN FRANCISCO, CALIFORNIA.

POCKET-CALCULATOR.

No. 801,354.  Specification of Letters Patent.  Patented Oct. 10, 1905.

Application filed June 15, 1904. Serial No. 212,671.

*To all whom it may concern:*

Be it known that I, FRANKLIN S. BECKETT, a citizen of the United States, residing in the city and county of San Francisco and State of California, have invented new and useful Improvements in Pocket-Calculators, of which the following is a specification.

My invention relates to improvements in calculating devices, and pertains particularly to a chart in the form of a pocket-tape designed for computing, multiplying, dividing, ascertaining the roots and powers of numbers, &c.

The object of my invention is to provide a simple, compact, handy device for calculating mathematical problems and which may be readily carried in the vest-pocket.

The invention consists of the parts and the construction and combination of parts, as hereinafter more fully described, having reference to the accompanying drawings, in which—

Figure 1 shows both sides of a flexible tape with three different scales representing my invention. Fig. 2 is a continuation of my device shown in Fig. 1. Fig. 3 is a continuation of same. Fig. 4 shows a suitable casing for tape. Fig. 5 shows a modification of my invention.

A represents a flexible tape of suitable length, width, and material, similar in general appearance to the ordinary pocket-tape, which is adapted to be wound up automatically on a spring-actuated spool contained in a suitable casing 2. One side of the tape may be divided off in usual fashion into feet and inches, as indicated at 3. The opposite side of the tape contains two scales 4 5: respectively a natural scale and a corresponding logarithmic scale, by which the computations contemplated by the present invention are ascertained. The nature of these scales and their mode of operation will be explained later.

If desired, a portion of the tape may contain on one side a scale 6 of a whole number divided into decimals and a corresponding fractional scale 7 on the opposite side, whereby the usefulness of the invention may be enhanced.

Since every decimal has its corresponding equivalent fraction, the notation on scale 6 bears a certain definite relation to that on scale 7, so that if it is desired to find the equivalent fraction of any decimal it is only necessary to find that decimal on scale 6. Turn over the tape and the fraction on scale 7 directly opposite the decimal just indicated will give the desired result. For instance, to find the equivalent fraction of .8125. Solution: Find ".8125" on scale 6. Turn tape over and read fraction on scale 7 directly opposite ".8125," which will be "$\frac{13}{16}$." Conversely, to find the decimal equivalent of thirteen-sixteenths, note location of "$\frac{13}{16}$" on scale 7. Turn tape over and read the decimal on scale 6 immediately opposite "$\frac{13}{16}$," which will be ".8125."

In Figs. 1, 2, 3 the scales 4 5 are arranged lengthwise and on the same side of the tape one above the other and divided by the longitudinal line 8. They could be arranged on opposite sides of the tape, if desired, as shown in Fig. 5.

The scale 4 represents a series of natural numbers and decimal fractions thereof arranged consecutively, as shown. The scale 5 represents the corresponding logarithms of the several numbers on scale 4 and their fractions. For convenience the figures in scale 4 may be indicated on the tape in black and those in scale 5 in red. In fact, in referring to the the tape the natural numbers may be called the "black" numbers and the logarithms the "red" numbers.

Since every numeral has a logarithmic equivalent just as every decimal has a fractional equivalent, the logarithmic notations of scale 5 are placed opposite or in the same horizontal line with their corresponding numerals of scale 4. For instance, the logarithms of "5," "8¾," and "10" are ".699," ".942," and "1," respectively. Conversely, the black or natural numbers corresponding to the red numbers or logarithms ".699," ".942," and "1" are "5," "8¾," and "10," respectively. By means of the double scale 4 five problems in multiplication or division may be solved or any power or any root of any number may be found by performing simple addition or subtraction and reading results from the scales, according to well-known mathematical principles.

It will be noticed that the numbers in scale 4 run only from 1 to 10, inclusive. When the quantity is too large to come within the limits of the scale, the decimal point is moved to the left far enough to bring it within those limits. Then to make a proper allowance for the change in the value of the quantity a figure is placed in front of the corresponding number in scale 5 equal to the number of degrees the decimal point was moved. The total logarithm number then corresponds to the original quantity before the decimal point was changed. Example: To find the logarithms corresponding to 40: (a) By moving the decimal point one degree to the left 40 becomes ".4.0" and by reference to the tape the logarithm of 4 is found to be ".602." As the decimal point was moved one degree the integer 1 must be placed before ".602." Therefore the logarithm of 40=1.602. Ans.

When the quantity is too small to come within the limits of the scale it is treated in a similar manner, except that as the total logarithm number increases as the corresponding natural number increases it must also decrease as the corresponding natural number decreases. This is provided for by placing a minus sign over the additional figure, thus making it, and it only, minus, but altering the value of the total logarithm number sufficiently to make it still correspond to the original natural number. Example: What logarithms correspond to .95 of the natural scale 4. (a) By moving the decimal point one degree .95 is increased to 9.5 and brought within the limits of the scale. By reference to the tape the logarithm of 9.5 is found to be .978. As the decimal point was moved one degree the integer 1 must be placed before .978 and as the original natural number was increased to come within the limits of the scale the corresponding logarithm number must be decreased to correspond to the original natural number. Therefore, the minus sign is placed over the logarithmic integer 1. Therefore .95=1.978. Ans.

To multiply two or more quantities: Find the black or natural number corresponding to the sum of their corresponding red or logarithm numbers.

To find the power of a number: Multiply the red number corresponding to the quantity by the amount the quantity is to be raised. The power will be the black number corresponding to the result.

To find the root of a number: Divide the red—i. e., the logarithm number corresponding to the quantity—by the amount the quantity is to be reduced. The root will be the black—i. e., the natural number corresponding to the result.

There is nothing new of course in calculating by means of tables of logarithms; but the arrangement of a table of logarithms in the compact and convenient form here shown is believed to be novel.

The foregoing examples are merely given to illustrate the scope of the present invention and to indicate that any one having a simple knowledge of the first principles of arithmetic can profit by its use.

Inasmuch as the numerical interval between the natural numbers corresponding to successive logarithmic numbers arranged in arithmetical progression increases more rapidly than and in different ratio from the progression of the logarithmic numbers it is preferred that some means should be adopted whereby the graduations on the two scales will be kept within a certain range. For instance, the markings of the logarithmic scale 5 proceeds in arithmetical progression thus: "0, .05, .1, .15, .2, .25, .3, .35, .4, .45, .5, .55, .6, .65, .7, .75, .8, .85, .9, .95, 1," or with a uniform numerical interval of .05, while the corresponding natural numbers of scale 4 run "1, 1.25, 1.58, 1.99, 2.51, 3.16, 3.99, 5.01, 6.31, 7.95, 10," or a variable numerical interval thus: ".25, .33, .41, .52, .65, .83, 1.02, 1.30, 1.64, 2.05." Consequently if we space all the numbers of the logarithmic scale equally on the tape and just a convenient distance apart we will have the numbers of the natural scale at one end spread far apart and those on the opposite end crowded too close together—that is, if the spaces between 0 and .05 and between .05 and .1 and so on along the entire logarithmic scale are each two inches, the spaces between the corresponding numbers on the natural scale will gradually decrease. Hence in order to maintain a certain mean distance between all the figures on both scales I space the figures on the first half of the logarithmic scale equally, allowing the spaces between the figures of the natural scale gradually to decrease till a minimum space is reached, (or the space equal to that between the figures of the first half of the logarithmic scale,) whereupon for the rest of the tape the figures on the natural scale will be spaced equally and the spaces between the remainder of the figures on the logarithmic scale are allowed to increase in their proper order. Thus the measured distance between any two adjacent figures will not be less than such minimum space as can be conveniently divided into fifths, tenths, hundredths, &c., the basis of the invention being the expression of logarithmic values by scales or graduated distances rather than by figures, as in ordinary printed tables. The same principle of expression will hold good on a rigid support or chart as well as on a tape. In fact, this tape is to be considered as a chart, since by chart is meant a card, sheet, ruler, square, tape, or like or equivalent support.

Having thus described my invention, what I claim, and desire to secure by Letters Patent, is—

1. A flexible tape longitudinally divided along one side into two scales, one scale graduated to a series of natural numbers, the other to the corresponding logarithms of said numbers or their fractions, and the graduations so arranged that a portion of the numbers of one scale are equally spaced while the spaces between the corresponding figures of the other scale vary, substantially as herein described.

2. A flexible tape longitudinally divided into two scales, one graduated according to a scale of natural numbers and the other to the corresponding logarithms of said numbers or fractions thereof, a portion of the numbers of one scale being equally spaced while allowing the spaces between the corresponding figures of the other scale to vary, and then preserving a uniform distance between succeeding figures of the last-named scale and allowing the corresponding figures of the first-named scale to vary, whereby a convenient distance will be maintained between all the figures of both scales and crowding avoided.

In testimony whereof I have hereunto set my hand in presence of two subscribing witnesses.

FRANKLIN S. BECKETT.

Witnesses:
S. H. NOURSE,
JESSIE C. BRODIE.